April 28, 1942. E. H. LAND 2,281,101
DICHROIC STEREOSCOPIC PRINT WITH REFLECTING BACKING
Filed June 7, 1940
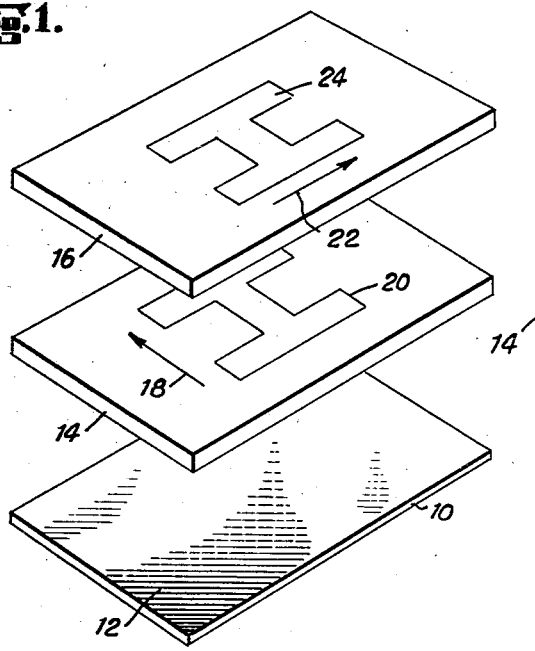
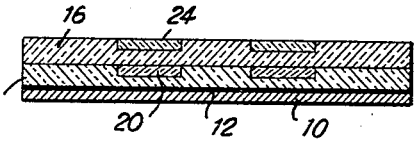
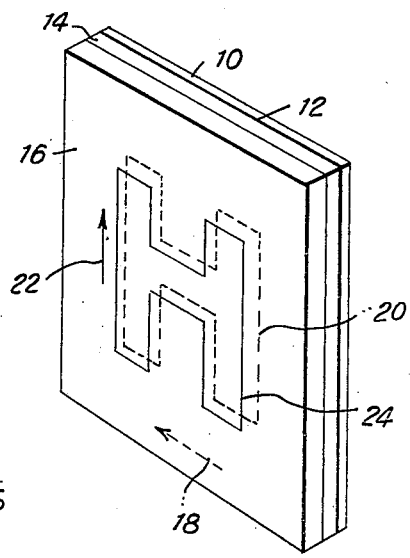
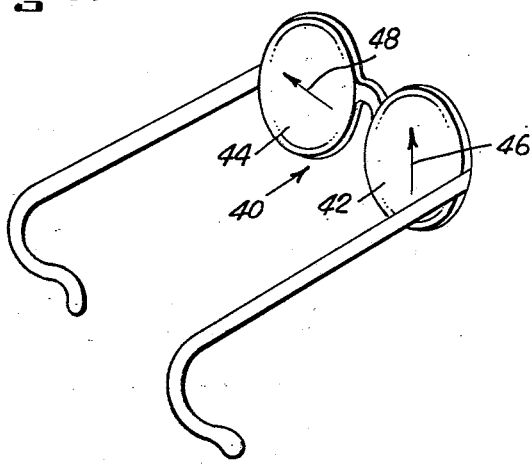
INVENTOR
Edwin H. Land
BY Donald L. Brown
attorney Patented Apr. 28, 1942

2,281,101

UNITED STATES PATENT OFFICE 2,281,101

DICHROIC STEREOSCOPIC PRINT WITH REFLECTING BACKING

Edwin H. Land, Boston, Mass., assignor to Polaroid Corporation, Dover, Del., a corporation of Delaware Application June 7, 1940, Serial No. 339,252

16 Claims. (Cl. 88—29)

This invention relates to means for providing stereoscopic prints wherein a three-dimensional effect is achieved by the use of polarized light.

It is an object of this invention to provide, as a new article of manufacture, a stereoscopic print comprising means providing superimposed right eye and left eye dichroic stereoscopic images backed by a reflecting surface.

A further object is to provide such an article in the form of a pair of sheets of transparent material and a third sheet providing a light-reflecting surface adjacent the outer surface of one of said transparent sheets, each of said transparent sheets having the desired design reproduced thereon by predetermined alteration of its surface with respect to polarizing characteristics.

Other objects and advantages will in part appear and in part be pointed out in the course of the following description of one embodiment of the invention, which is given, as a non-limiting example, in connection with the accompanying drawing, in which:

Figure 1 is a perspective view showing the component elements ready to be assembled into an article embodying one form of the invention;

Fig. 2 is a view in section, showing the same elements after they have been assembled to form the completed print;

Fig. 3 is a perspective view, showing somewhat diagrammatically the article shown in Fig. 2; and Fig. 4 shows a pair of eye glasses which may be used as an analyzer for observing the three-dimensional effect in pictures produced in accordance with the invention.

In one form, the article which embodies the present invention comprises three elements, a backing plate or sheet providing a light-reflecting surface, and a pair of sheets of transparent material, each of which has formed therein a light-polarizing design or image comprising areas adapted to polarize transmitted light to different predetermined extents, the polarizing axes of the polarizing areas of one sheet being at right angles to the polarizing axes of the polarizing areas of the other sheet. The two sheets, which carry respectively, preferably, right eye and left eye light-polarizing images, are superimposed on the reflecting surface, preferably in such positions with respect to each other that the images carried thereby are substantially superimposed. In order to observe the three-dimensional effect in such a print, it is merely necessary to view it through an analyzer which comprises separate screens or lenses of light-polarizing material for each eye, with the polarizing axis of one lens parallel to the polarizing axis of one of said sheets and the polarizing axis of the other lens parallel to the polarizing axis of the other sheet. In this way, one eye of the observer will see only that image whose polarizing axis is perpendicular to the polarizing axis of the lens before it, and the other eye will see only the image carried by the other sheet, thus producing a three-dimensional effect.

The invention will be understood more easily by reference to Figs. 1–3 of the accompanying drawing, which shows a simple embodiment of the invention comprising backing plate 10, having a light-reflecting surface 12, and a pair of sheets 14 and 16 of suitable transparent material. Backing plate 10 may be made of any material which will provide a satisfactory light-reflecting surface 12, such as paper coated with a metallic reflecting layer, or a metal mirror, or a metal foil. It is usually desirable to have either the reflecting backing or the sheet, or the surface of the outer sheet give enough diffusion to make the image visible under a wide variety of viewing conditions. A suspension of aluminum flake in a plastic is a suitable backing.

Under some conditions, as when sheets 14 and 16 are of sufficiently heavy material, a satisfactory reflecting surface 12 may be obtained by applying a coating of light-reflecting material, such as aluminum flake, to the exposed surface of either sheet 14 or 16. It is to be understood that any and all such means for providing a reflecting surface are to be considered as coming within the scope of this invention.

Sheets 14 and 16 may be formed of a variety of materials, and the designs or images may be reproduced therein in a variety of ways. For example, sheet 14 may initially be formed of a light-polarizing material, such as an optically oriented suspension of minute crystals of herapathite or other polarizing material in a suitable medium, such as cellulose acetate, the direction of orientation of the crystals being indicated by arrow 18. Any desired predetermined picture, indicia or design 20 may then be reproduced on sheet 14 by destroying or otherwise altering the polarizing characteristics of the sheet over predetermined areas of the surface of the sheet. For example, either the areas forming the design 20 or the surrounding areas may be protected as by a coating such as of wax, or of a hardened gelatine resist, and the sheet then subjected to a treatment which destroys or otherwise alters the polarizing characteristics of the exposed areas. For the purposes of illustration, it may be assumed that the areas forming the design 20 have been protected, and that the polarizing characteristics of the surrounding areas of sheet 14 have been destroyed. Then the areas forming design 20 will be light-polarizing, with their polarizing axes parallel to arrow 18.

In this case sheet 16 will preferably be formed of the same material treated in the same way except that the polarizing crystals therein are initially oriented parallel to arrow 22, so that the polarizing axes of the areas forming design 24 are at right angles to the polarizing axes of the areas forming design 20 in sheet 14. The two sheets are then mounted in superimposed relation on backing plate 10 with reflecting surface 12 adjacent the bottom or outer surface of sheet 14, and may then be secured together to form a unit print by any suitable means, as by an adhesive. In mounting, the two sheets may be so positioned with respect to each other that the polarizing areas forming design 24 in sheet 16 substantially overlie the corresponding areas forming design 20 in sheet 14, as shown in Fig. 2.

A preferred method of forming the stereoscopic print of the present invention is to employ as the basic sheet material 14, 16 a linear hydrophilic polymeric plastic such as polyvinyl alcohol which has had its molecules substantially oriented. The dichroic stereoscopic images may be formed in this material by printing thereon with a water-soluble direct cotton dye of the azo type, or by staining the sheet with iodine in the presence of an iodide. The stain or dye may be applied to the sheet from a half tone plate, a gelatine relief, or the like, and the color of the dichroic image reproduced in the sheet may be controlled by selecting suitable dyes, stains or the like.

A left eye image may be formed in one sheet and a corresponding right eye image in the other. The sheets may be assembled with their directions of molecular orientation at right angles to each other, bonded together, and backed by a suitable reflecting surface. The backing may comprise a directly applied pigment, such as aluminum flake, or a coated sheet of paper or the like may be bonded to the plastic sheets by means of vinyl acetal, Vistanex, Acryloid B7, or other cement having preferably a refractive index closely approximating that of the plastic sheets carrying the dichroic images.

Fig. 4 shows a pair of eye glasses 40 suitable for viewing the above described print to observe the three-dimensional effect therein. Lenses 42 and 44 of glasses 40 both include material adapted to polarize transmitted light, such, for example, as one of the sheet polarizing materials sold under the trade name "Polaroid," and the polarizing axes of the two lenses are at right angles to each other. Right lens 42 is represented as positioned to absorb vertically vibrating light, as is indicated by arrow 46, and left lens 44 is represented as positioned to absorb horizontally vibrating light, as is indicated by arrow 48.

In describing the operation of the illustrated embodiment of the invention, it may be assumed that the compound print shown in Fig. 3 is being viewed through the glasses shown in Fig. 4. Light from whatever source which is reflected from surface 12 will first traverse polarizing areas 20. By definition, half of this light, namely the component vibrating vertically or parallel to arrows 22 and 46, will be transmitted by areas 20, regardless of their density. It will be seen, therefore, that this component is of no value in so far as transmitting the image on sheet 14 is concerned, and that to that extent it does not matter what happens to it after it leaves sheet 14. The other, horizontally vibrating, component will be absorbed by the polarizing material in areas 20, so that the light transmitted by areas 20 comprises only the component vibrating parallel to arrows 22 and 46. When this light traverses the overlying portions of polarizing areas 24 in sheet 16, this component will be absorbed by the polarizing material therein in the same way that the horizontally vibrating component was absorbed in traversing areas 20 in sheet 14.

It will now be seen that in the above example, the light whose direction of propagation passes through both of areas 20 and 24 will be entirely absorbed and none will reach glasses 40, whereas light which has traversed only the non-polarizing areas of sheets 14 and 16 will be unchanged from its original characteristics and intensity. At the same time, there will be some light which has passed through polarizing areas 20 and has accordingly been polarized to vibrate vertically, but which passes through non-polarizing areas of sheet 16. Similarly, some light which has passed through non-polarizing portions of sheet 14 has been polarized to vibrate horizontally in passing through polarizing areas 24. Thus the light reaching glasses 40 from the device will comprise some unpolarized light, some polarized light vibrating vertically and some polarized light vibrating horizontally. If under these conditions the device is viewed without glasses 40, those parts thereof wherein areas 20 and 24 directly overlie each other will appear black, whereas those polarizing areas which do not directly overlie each other will appear gray. The latter effect is produced by the fact that said areas transmit only one component, that is to say, only half as much light as the surrounding, non-polarizing areas, and hence appear gray by comparison therewith.

When the light which has traversed sheets 14 and 16 traverses lens 42 in glasses 40, the vertically vibrating component thereof will be absorbed within the lens. It will be seen that this absorbed light will include all of the vertically vibrating light which was not absorbed within polarizing areas 24. On the other hand, all the horizontally vibrating light which was not absorbed within polarizing areas 20 will be transmitted by lens 42. At the same time, all of the unpolarized light transmitted by the non-polarizing areas of sheets 14 and 16 will be polarized in traversing lens 42, and only the horizontally vibrating component will be transmitted. When, therefore, an observer wearing glasses 40 views the print shown in Fig. 3, his right eye will see sheet 14 as if sheet 16 were not present. Since all the horizontally vibrating light is transmitted by the areas of sheet 14 surrounding areas 20, those areas will look clear or white, but since the horizontally vibrating light traversing areas 20 is absorbed, those areas will look black. Furthermore, since this effect is due to the differential absorption of the horizontally vibrating component within sheet 14, and since all the horizontally vibrating light is freely transmitted by sheet 16, said effect is wholly independent of sheet 16, and the latter will appear transparent to the right eye of the observer. In particular, those portions of areas 24, which do not overlie portions of areas 20 and accordingly look gray when the device is viewed without glasses 40, will merge with the surrounding, non-polarizing areas and look clear or white. It follows that sheet 14 may if desired be used in combination with reflecting backing 12 and a suitable analyzer as a two-dimensional print independently of sheet 16.

The converse of the above described operation at lens 42 will take place at lens 44. All the horizontally vibrating light incident on said lens will be absorbed, with the result that sheet 14 will appear uniformly transparent. On the other hand, areas 24 in sheet 16 will appear black on a white background in the same manner as described above for sheet 14 and lens 42. It will thus be seen that the result is that the left eye of an observer wearing glasses 40 will see only left eye image 24, and his right eye will see only right eye image 20, thus producing a three-dimensional effect.

It should be pointed out that the polarizing axes of sheets 14 and 16 need not be as shown in the drawing, that is, parallel to an edge of the sheet. On the contrary, they may lie in any direction so long as they are at an angle of approximately 90° to each other. A particularly advantageous arrangement is for said axes to make angles of 45° with the edges of the sheets, in which case it will follow that the polarizing axes of lenses 42 and 44 should make angles of 45° with the horizontal and should of course be at right angles to each other.

The reflecting surface should be non-depolarizing or else should be slightly spaced from the closet image, for example by a clear portion of the plastic carrying the image, as in Fig. 2, in which case it may be either non-depolarizing, partially depolarizing or depolarizing, such as a mat surface of ordinary white paint or paper.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination, a sheet of transparent material comprising dichroic material forming light-polarizing areas positioned to provide a left eye stereoscopic image, a second sheet of transparent material bonded to said first sheet and comprising dichroic material forming light-polarizing areas with their polarizing axes at right angles to the axes of the areas of said first sheet, the areas of said second sheet positioned to provide a right eye stereoscopic image substantially overlying the image formed in said first sheet, and means providing a reflecting surface bonded to and facing the outer surface of one of said sheets.

2. In combination, a sheet of transparent material comprising dichroic material forming light-polarizing areas positioned to provide a left eye stereoscopic image, a second sheet of transparent material bonded to said first sheet and comprising dichroic material forming light-polarizing areas with their polarizing axes at right angles to the axes of the areas of said first sheet, the areas of said second sheet positioned to provide a right eye stereoscopic image substantially overlying the image formed in said first sheet, means providing a light-reflecting surface comprising aluminum flake, and means for securing said reflecting surface to and facing the outer surface of one of said sheets.

3. In combination, a sheet of transparent material comprising dichroic material forming light-polarizing areas positioned to provide a left eye stereoscopic image, a second sheet of transparent material bonded to said first sheet and comprising dichroic material forming light-polarizing areas with their polarizing axes at right angles to the axes of the areas of said first sheet, the areas of said second sheet positioned to provide a right eye stereoscopic image substantially overlying the image formed in said first sheet, and a sheet of paper coated with a reflecting substance bonded to the outer surface of one of said transparent sheets with said reflecting coating facing said transparent sheets.

4. As a new article of manufacture, transparent plastic means, overlying areas thereof forming light-polarizing right eye and left eye stereoscopic images having their corresponding polarizing axes substantially at right angles, and means providing a light-reflecting surface facing one surface of said plastic means and bonded thereto by an adhesive having an index of refraction approximating the index of refraction of said plastic means.

5. A light-polarizing stereoscopic print comprising means providing an opaque, light-reflecting surface, transparent plastic means bonded to said surface, said plastic means comprising a plurality of overlying layers, each layer comprising means forming a light-polarizing image, one image being a right eye stereoscopic image, the other image being a left eye stereoscopic image, the polarizing axes of the means forming said images being substantially at right angles.

6. A light-polarizing stereoscopic print comprising transparent plastic means, overlying areas thereof forming light-polarizing right eye and left eye stereoscopic images having their corresponding polarizing axes substantially at right angles, and means providing a light-reflecting, non-depolarizing surface bonded to and facing one surface of said plastic means.

7. A light-polarizing stereoscopic print comprising transparent plastic means, overlying areas thereof forming light-polarizing right eye and left eye stereoscopic images having their corresponding polarizing axes substantially at right angles, and means providing a light-reflecting, depolarizing surface bonded to and facing one surface of said plastic means, there being an appreciable thickness of clear plastic between said surface and the nearest adjacent stereoscopic image.

8. As a new article of manufacture, a plurality of overlying layers of transparent, plastic material, means providing light-polarizing areas in each of said layers, the polarizing axes of said polarizing areas in one of said layers being substantially perpendicular to the polarizing axes of said polarizing areas in the other of said layers, said polarizing areas in one of said layers being so arranged with respect to relative position and density as to form in combination a predetermined image, said polarizing areas in the other said layer being similarly so arranged as to form a different predetermined image, means providing a light-reflecting surface adjacent to and facing said layers, and means for securing said elements together.

9. As a new article of manufacture, a plurality of overlying layers of transparent, plastic material, means providing light-polarizing areas in each of said layers, the polarizing axes of said polarizing areas in one of said layers being substantially perpendicular to the polarizing axes of said polarizing areas in the other of said layers, said polarizing areas in one of said layers being so arranged with respect to relative position and density as to form in combination a predetermined image, said polarizing areas in the other said layer being similarly so arranged as to form a different predetermined image, said images being respectively right eye and left eye stereoscopic images, means providing a light-reflecting surface adjacent to and facing said layers, and means for securing said elements together.

10. As a new article of manufacture, a plurality of overlying layers of transparent, plastic material, means providing a light-polarizing image in one of said layers, means providing a different light-polarizing image in the other of said layers, the respective polarizing axes of said polarizing images being relatively perpendicular, means providing a light-reflecting surface adjacent to and facing said layers, and means for securing said elements together.

11. As a new article of manufacture, a plurality of overlying layers of transparent, plastic material, means providing a light-polarizing image in one of said layers, means providing a different light-polarizing image in the other of said layers, the respective polarizing axes of said polarizing images being relatively perpendicular, said images being respectively right eye and left eye stereoscopic images, means providing a light-reflecting surface adjacent to and facing said layers, and means for securing said elements together.

12. As a new article of manufacture, a plurality of overlying layers of molecularly oriented, transparent plastic material from the class consisting of the linear, hydrophilic polymers, the direction of molecular orientation in one of said layers being substantially perpendicular to that in the other said layer, predetermined areas in one of said layers having incorporated therein a stain whereby they are rendered light-polarizing, said stained areas forming in combination a predetermined image, the other of said layers having a different predetermined image similarly reproduced therein, said images being respectively right eye and left eye stereoscopic images, means providing a light-reflecting surface adjacent to and facing said layers, and means for securing said elements together.

13. As a new article of manufacture, a plurality of overlying layers of molecularly oriented, transparent polyvinyl alcohol, the direction of molecular orientation in one of said layers being substantially perpendicular to that in the other said layer, predetermined areas in one of said layers having incorporated therein a stain whereby they are rendered light-polarizing, said stained areas forming in combination a predetermined image, the other of said layers having a different predetermined image similarly reproduced therein, said images being respectively right eye and left eye stereoscopic images, means providing a light-reflecting surface adjacent to and facing said layers, and means for securing said elements together.

14. As a new article of manufacture, a plurality of overlying layers of transparent plastic material from the class consisting of the linear, hydrophilic polymers, means providing a light-polarizing image in one of said layers, means providing a different light-polarizing image in the other of said layers, the respective polarizing axes of said polarizing images being relatively perpendicular, said images being respectively right eye and left eye stereoscopic images, means providing a light-reflecting surface adjacent to and facing said layers, and means for securing said elements together.

15. As a new article of manufacture, a plurality of overlying layers of transparent polyvinyl alcohol, means providing a light-polarizing image in one of said layers, means providing a different light-polarizing image in the other of said layers, the respective polarizing axes of said polarizing images being relatively perpendicular, said images being respectively right eye and left eye stereoscopic images, means providing a light-reflecting surface adjacent to and facing said layers, and means for securing said elements together.

16. As a new article of manufacture, a plurality of overlying layers of molecularly oriented, transparent polyvinyl alcohol, the direction of molecular orientation in one of said layers being substantially perpendicular to that in the other said layer, predetermined areas in one of said layers having incorporated therein a stain comprising a polyiodide, said stained areas forming in combination a predetermined image, the other of said layers having a different predetermined image similarly reproduced therein, said images being respectively right eye and left eye stereoscopic images, means providing a light-reflecting surface adjacent to and facing said layers, and means for securing said elements together.

EDWIN H. LAND.